US012176577B2

(12) United States Patent
Cavus et al.

(10) Patent No.: US 12,176,577 B2
(45) Date of Patent: Dec. 24, 2024

(54) METHOD FOR INTERCONNECTING CELL STACKS OF A BATTERY MODULE IN A HIGH-VOLTAGE BATTERY

(71) Applicant: Dr. Ing. h.c. F. Porsche Aktiengesellschaft, Stuttgart (DE)

(72) Inventors: Enerji Cavus, Stuttgart (DE); Philipp Kellner, Renningen (DE); Max Falk, Wiesloch (DE); Christopher Volkmer, Niefern-Öschelbronn (DE); Marco Augustdörfer, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 17/531,970

(22) Filed: Nov. 22, 2021

(65) Prior Publication Data

US 2022/0166112 A1 May 26, 2022

(30) Foreign Application Priority Data

Nov. 23, 2020 (DE) ...................... 10 2020 130 898.1

(51) Int. Cl.
*H01M 50/517* (2021.01)
*H01M 50/209* (2021.01)
(Continued)

(52) U.S. Cl.
CPC ....... *H01M 50/517* (2021.01); *H01M 50/209* (2021.01); *H01M 50/244* (2021.01);
(Continued)

(58) Field of Classification Search
CPC ....... H01M 50/20; H01M 50/204–211; H01M 50/233–242; H01M 50/249; H01M 50/296–298
See application file for complete search history.

(56) References Cited

U.S. PATENT DOCUMENTS

2018/0034014 A1* 2/2018 Ichikawa .......... H01M 10/0413
2019/0123318 A1* 4/2019 Fees ....................... H01M 50/51
(Continued)

FOREIGN PATENT DOCUMENTS

DE 102014017081 A1 * 5/2016 ............. H01M 2/34
DE 102017127807 A1 5/2019
(Continued)

OTHER PUBLICATIONS

Machine translation of Baum et al., EP-3493293-A1. Originally available Jun. 5, 2019. (Year: 2019).*
(Continued)

*Primary Examiner* — Jonathan Crepeau
*Assistant Examiner* — Jacob Buchanan
(74) *Attorney, Agent, or Firm* — Buchanan Ingersoll & Rooney PC

(57) ABSTRACT

A method for interconnecting cell stacks of a battery module in a battery. In the battery module, the cell stacks are arranged in a battery module housing. In each case two cell stacks are arranged next to one another and form a cell stack group, and the two cell stack groups are arranged behind one another. The two cell stacks of the first cell stack group are inserted into the battery module housing. The two cell stacks of the first cell stack group are electrically interconnected via at least one opening arranged in a wall of the battery module housing. The two cell stacks of the second cell stack group are inserted into the battery module housing. Electrically interconnecting the two cell stacks of the second cell stack group to each one of the two cell stacks of the first cell stack group.

21 Claims, 9 Drawing Sheets

Figure 1:
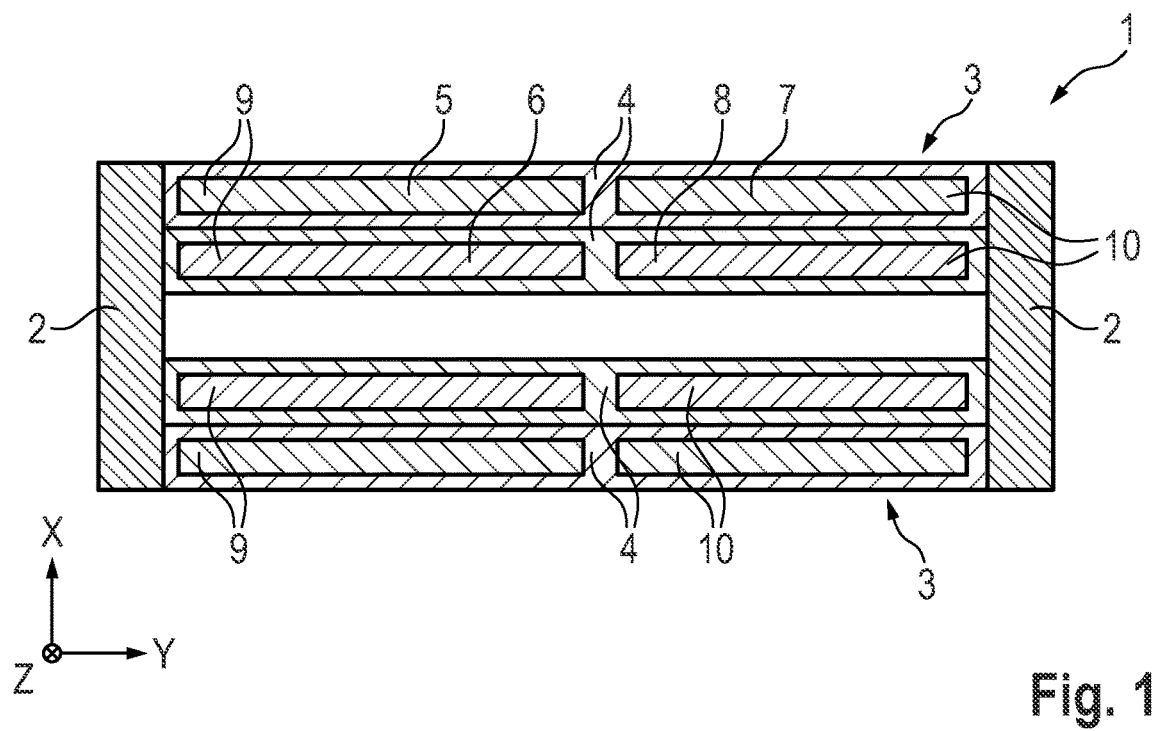

(51) Int. Cl.
    *H01M 50/244*     (2021.01)
    *H01M 50/258*     (2021.01)
    *H01M 50/289*     (2021.01)
    *H01M 50/296*     (2021.01)
    *H01M 50/502*     (2021.01)

(52) U.S. Cl.
    CPC ....... *H01M 50/258* (2021.01); *H01M 50/289* (2021.01); *H01M 50/296* (2021.01); *H01M 50/502* (2021.01)

(56) References Cited

U.S. PATENT DOCUMENTS

| | | | |
|---|---|---|---|
| 2019/0165437 A1* | 5/2019 | Kellner | H01M 10/6556 |
| 2020/0016988 A1 | 1/2020 | Kellner | |
| 2020/0127255 A1 | 4/2020 | Moon et al. | |
| 2020/0127258 A1* | 4/2020 | Lim | H01M 10/625 |
| 2020/0384868 A1* | 12/2020 | Kellner | H01M 50/503 |
| 2021/0226281 A1* | 7/2021 | Kellner | H01M 10/613 |

FOREIGN PATENT DOCUMENTS

| | | | |
|---|---|---|---|
| DE | 102018205951 A1 | 10/2019 | |
| DE | 102018117068 A1 | 1/2020 | |
| EP | 3493293 A1 * | 6/2019 | ............ B32B 17/02 |
| EP | 3641004 A1 | 4/2020 | |
| KR | 20200044577 A | 4/2020 | |

OTHER PUBLICATIONS

Machine translation of DE-102014017081-A1, Meintschel. Originally available May 19, 2016. (Year: 2016).*

Great Britain Search Report for Application No. GB2116862.0, dated May 11, 2022, 2 pages.

English translation of the Office Action (First Office Action) issued Dec. 20, 2023, by the China National Intellectual Property Administration in corresponding Chinese Patent Application No. 202111400886.5. (7 pages).

* cited by examiner

METHOD FOR INTERCONNECTING CELL STACKS OF A BATTERY MODULE IN A HIGH-VOLTAGE BATTERY

CROSS-REFERENCE TO RELATED APPLICATION

This application claims priority to German Patent Application No. 10 2020 130 898.1, filed Nov. 23, 2020, the content of such application being incorporated by reference herein in its entirety.

FIELD OF THE INVENTION

The invention relates to a method for interconnecting cell stacks of a battery module in a high-voltage battery, wherein, in the battery module, the cell stacks are arranged in a battery module housing, which is open at the end, wherein in each case two cell stacks are arranged next to one another and form a cell stack group, and two cell stack groups arranged behind one another are arranged with their ends toward one another.

The method is used in particular in a high-voltage battery, which is used in an electrically or partially electrically drivable vehicle, in particular a passenger vehicle.

BACKGROUND OF THE INVENTION

A battery module in a high-voltage battery is known from DE 10 2018 117 068 A1, which is incorporated by reference herein. In this battery module, the cell stacks are arranged in a battery module housing which is open on remote end sides, that is to say on both sides. In each case, two cell stacks are arranged next to one another and form a cell stack group. Two cell stack groups arranged behind one another are arranged with their ends toward one another. The mounting direction of the two cell stack groups runs in an opposing manner.

DE 10 2017 127 807 A1, which is incorporated by reference herein describes a battery module in a high-voltage battery for use in a motor vehicle. In this case, a battery module housing produced in an extrusion method receives two cell stacks, which are arranged in separate chambers of the battery module housing. The chambers are formed by an intermediate wall of the battery module housing.

In view of the above, it would be desirable to provide an installation-space-saving interconnection of the cell stacks of a battery module.

SUMMARY OF THE INVENTION

Described herein is a method for interconnecting cell stacks of a battery module in a high-voltage battery. In this case, in the battery module, the cell stacks are arranged in a battery module housing, which is open at the end. In each case, two cell stacks are arranged next to one another and form a cell stack group. Two cell stack groups arranged behind one another are arranged with their ends toward one another.

The following method features are provided:
a. inserting the two cell stacks of the first cell stack group into the battery module housing,
b. electrically interconnecting the two cell stacks of the first cell stack group via at least one opening arranged in a wall of the battery module housing,
c. inserting the two cell stacks of the second cell stack group into the battery module housing and electrically interconnecting same to each one of the two cell stacks of the first cell stack group,
wherein the two cell stacks of the first cell stack group are electrically interconnected on the side thereof that faces the second cell stack group.

The described components are therefore electrically interconnected not in the region of remote end sides of the battery module but in a central region of the battery module. In this case, at least for the electrical interconnection of the two cell stacks of the first cell stack group, the one wall of the battery module housing has the at least one opening. The interconnection region of the two cell stacks of the first cell stack group is accessible by way of this opening, with the result that the two cell stacks can be electrically interconnected easily via at least one opening. In said central region, the cell stacks of the second cell stack group are also electrically interconnected with the respective one of the two cell stacks of the first cell stack group.

This interconnection makes it possible to form the arrangement of the cell stack groups to be compact, in relation to the insertion direction thereof, with the consequence that the battery module housing can be constructed to be relatively short.

In accordance with one preferred development, provision is made for the two cell stacks of the second cell stack group to be electrically interconnected to each one of the two cell stacks of the first cell stack group via at least one opening arranged in a wall of the battery module housing. In principle, this interconnection can also take place immediately upon the two cell stack groups being pushed together. However, it is considered to be preferable if the two cell stack groups are connected to one another in a mechanical manner and the electrical switching takes place as a result thereof. In order to carry out the interconnection process, said opening is provided in the wall of the battery module housing.

It is considered to be particularly advantageous if the two cell stacks of the second cell stack group are electrically interconnected to each one of the two cell stacks of the first cell stack group and the two cell stacks of the first cell stack group are electrically interconnected via the same opening arranged in the wall of the battery module housing. The interconnection processes can therefore be performed by way of said opening arranged in the central region of the battery module housing.

The battery module housing is preferably designed to be open on remote end sides and the cell stacks of the first cell stack group are inserted into the battery module housing from one side and the cell stacks of the second cell stack group are inserted into the battery module housing from the other side. The cell stacks of the two cell stack groups are therefore mounted in an opposing manner. In principle, the battery module housing can also be open only on one end side and first of all the cell stacks of the first cell stack group are inserted into the battery module housing and interconnected and only then are the cell stacks of the second cell stack group inserted into the battery module housing and interconnected.

It is considered to be particularly advantageous if the cell stacks of the two cell stack groups are inserted into a battery module housing designed as an extrusion profile. The design as an extrusion profile has the particular advantage that the battery module housing can be produced in a particularly simple and cost-effective manner and, moreover, a guiding of the respective cell stack during insertion into the battery module housing can be presented.

For reasons of stability, it is considered to be particularly advantageous if the battery module housing has a partition and the cell stacks of the respective cell stack group, separated by the respective partition, are inserted into the battery module housing. The partition is provided with an interruption at least in that region in which the two cell stacks of the first cell stack group are electrically interconnected. This makes it possible to electrically connect the cells stacks of the first cell stack group that are arranged next to one another, for example by means of a power distribution unit.

In accordance with one preferred development of the method, provision is made for the cell stacks of the second cell stack group to be inserted into the battery module housing in such a way that high-voltage connections of the two cell stacks of the second cell stack group are arranged flush with first high-voltage connectors of the electrically interconnected cell stacks of the first cell stack group and also between these first high-voltage connectors and the opening by means of which the two cell stacks of the first cell stack group are electrically interconnected. The respective battery module is connected by means of the high-voltage connections. The high-voltage connectors are used to connect the individual cell stacks to one another.

In accordance with one advantageous development of the method, provision is made for the cell stacks of the second cell stack group to be inserted into the battery module housing in such a way that second high-voltage connectors of the two cell stacks of the second cell stack group make electrical contact with third high-voltage connectors of the cell stacks of the first cell stack group.

In particular, provision is made for the respective second and third high-voltage connectors to be interconnected with one another via the opening. One development makes provision for the respective second and third high-voltage connectors to be connected to one another by means of a screw connection for this purpose.

It is particularly advantageous if, aside from the electrical contact connection and thus usually mechanically stable connection, the cell stacks, which are arranged behind one another, of the first and second cell stack group are plugged one inside the other. Positioning of the cell stacks, arranged behind one another, in a manner perpendicular to the plugging direction thereof is thus ensured by suitable means, in particular centering means.

The plugging means can also be suitable for use as a stop during the insertion of the cell stacks of the second cell stack group with respect to the cell stacks of the first cell stack group, whereby from the outset a clear positioning of the high-voltage connectors for the purpose of electrical contact connection is ensured.

In the method according to aspects of the invention along with the described developments thereof, in particular a single opening is provided in the battery module housing, which is designed in particular as an extrusion profile. The accessibility due to this opening makes it possible to arrange several interconnections above one another and to carry out a part of the interconnection as early as after the insertion of the two cell stacks of the first cell stack group. The interconnection of the two cell stacks of the first cell stack group can then be covered by the further high-voltage connections through the insertion of the two cell stacks of the second cell stack group. As a result of this, the installation space requirement for the accessibility of the high-voltage contact connections is reduced and the high-voltage interconnections can be arranged above one another.

Further features of the invention will emerge from the subclaims, from the appended drawing and from the description of the exemplary embodiment depicted in the drawing, without the invention being restricted thereto.

BRIEF DESCRIPTION OF THE INVENTION

Figure 2:
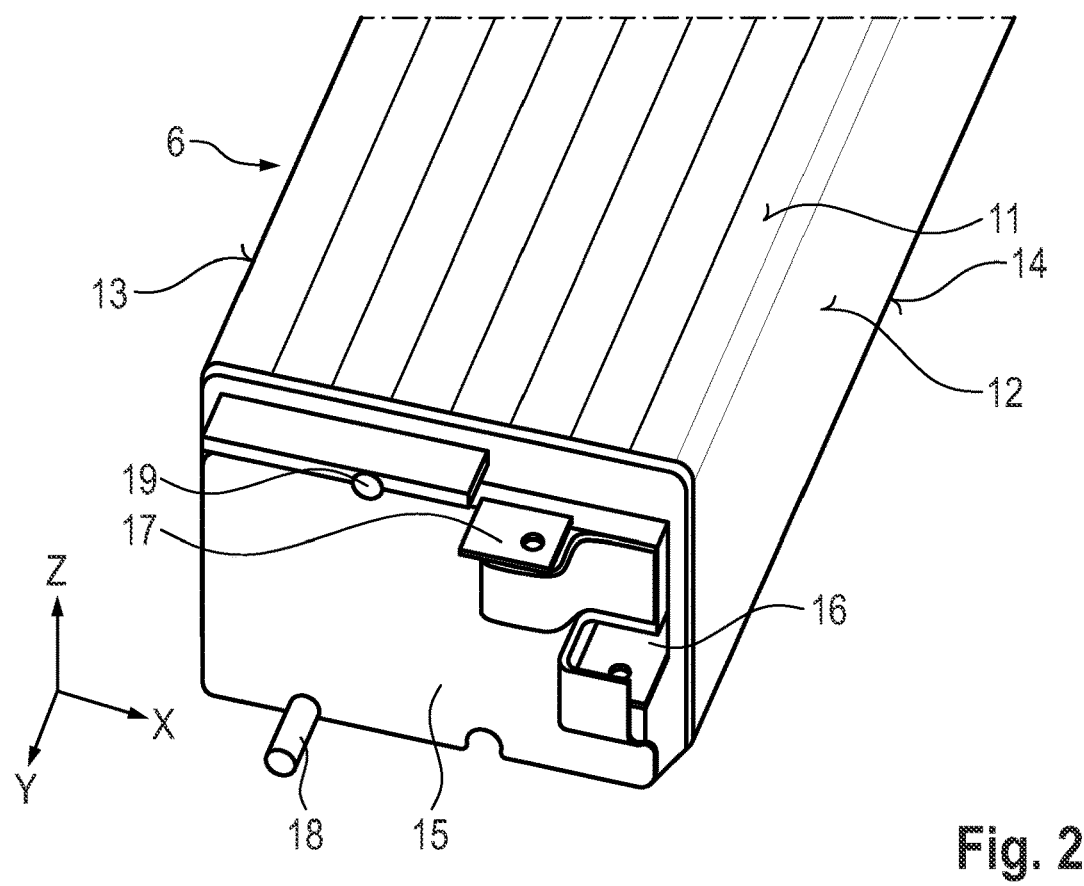
Figures 3, 4:
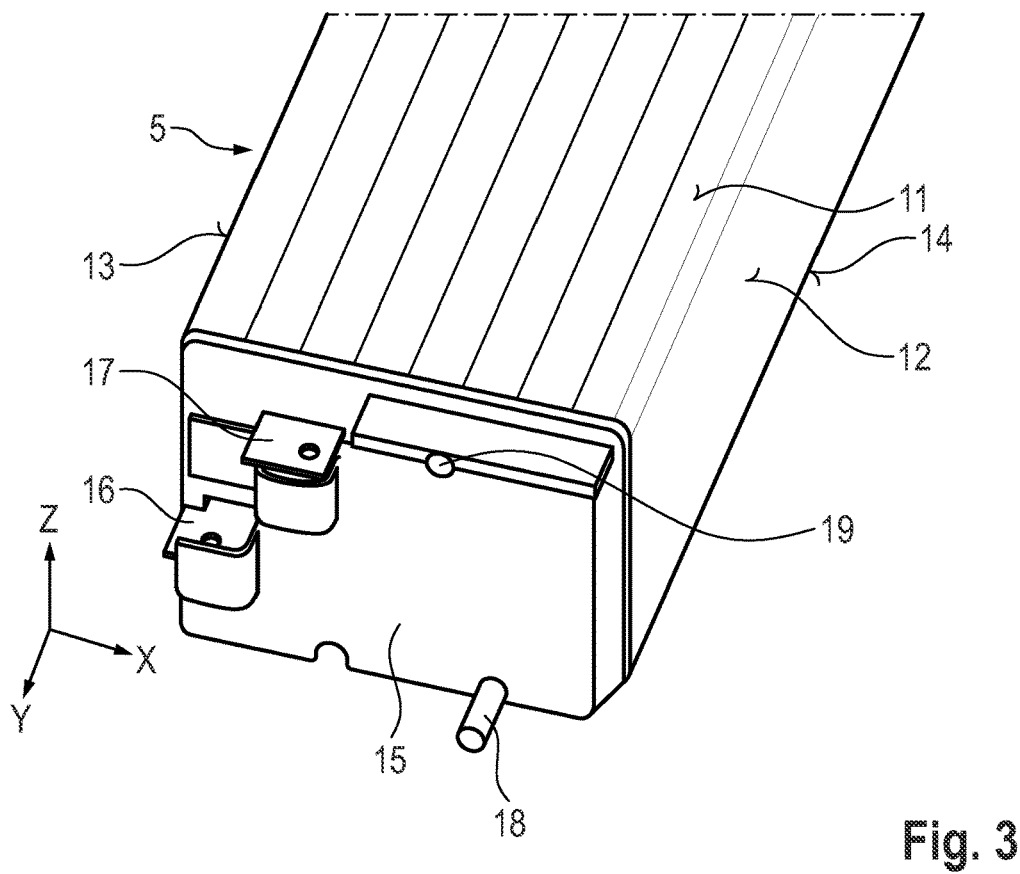
Figure 5:
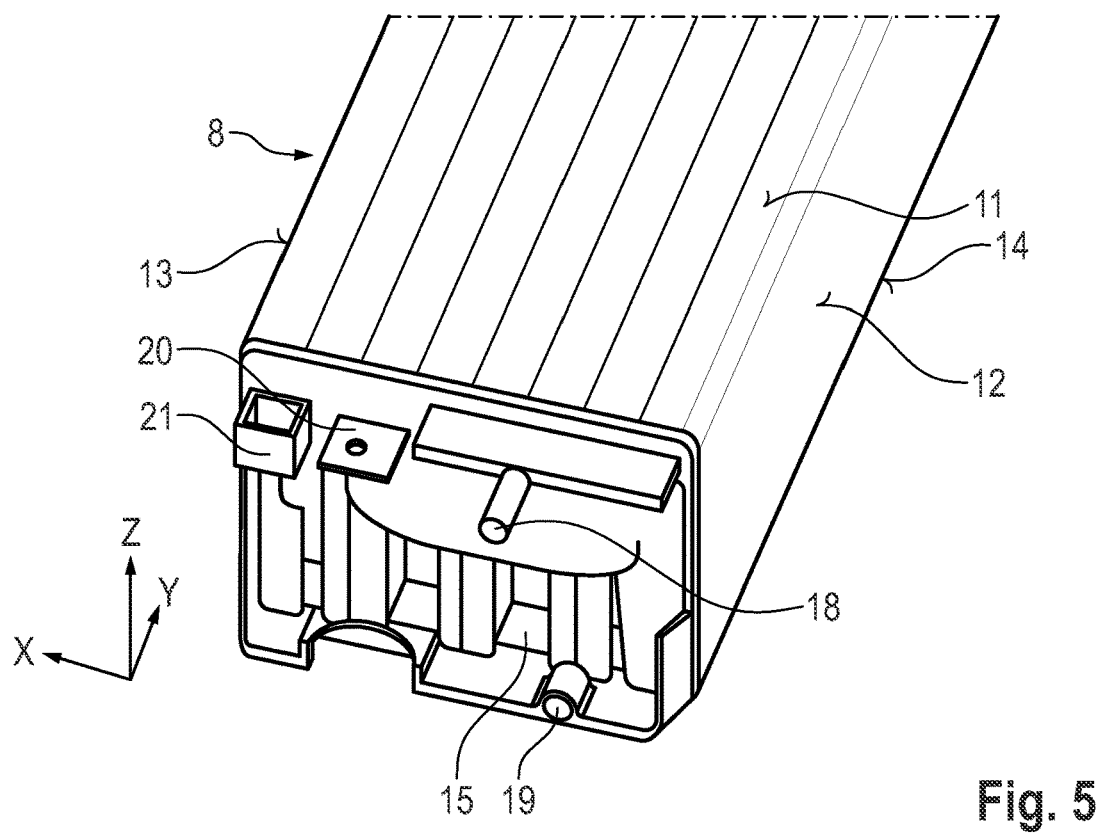
Figure 6:
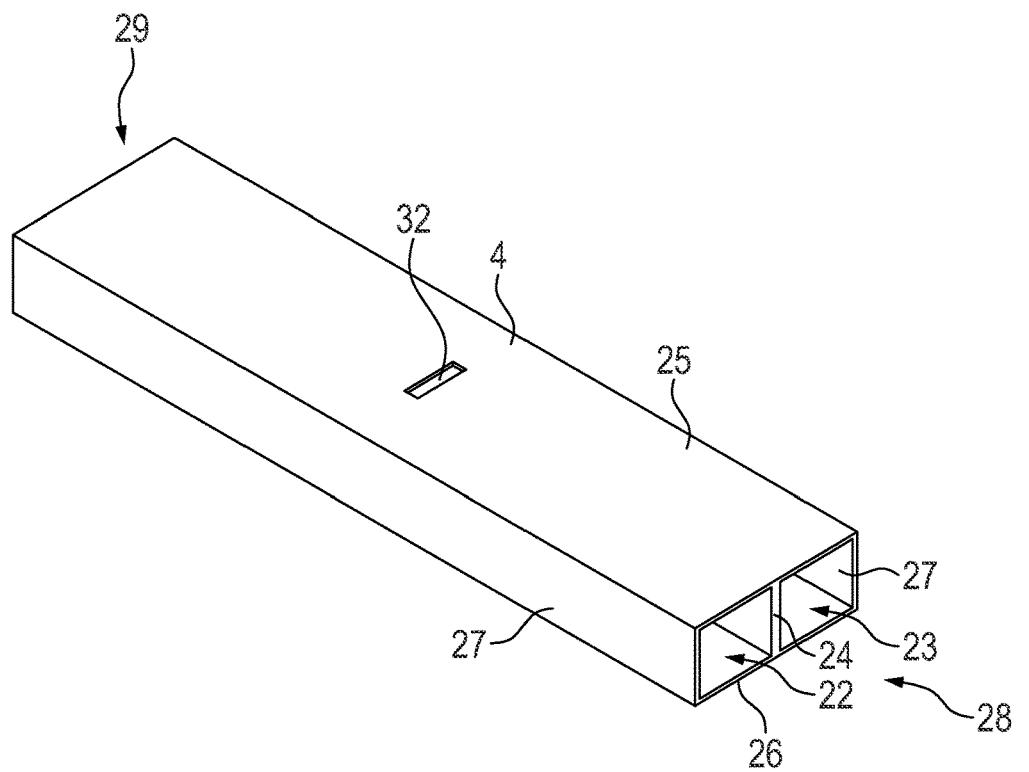
Figure 7:
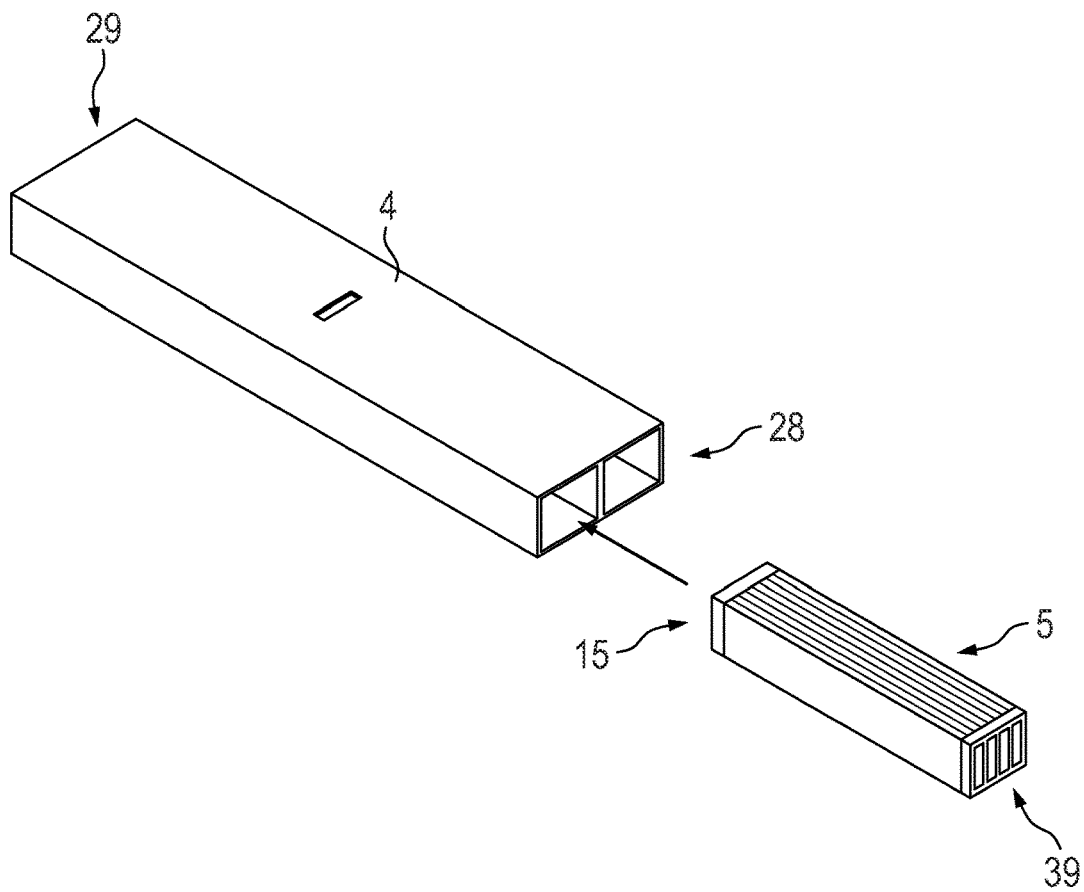
Figure 8:
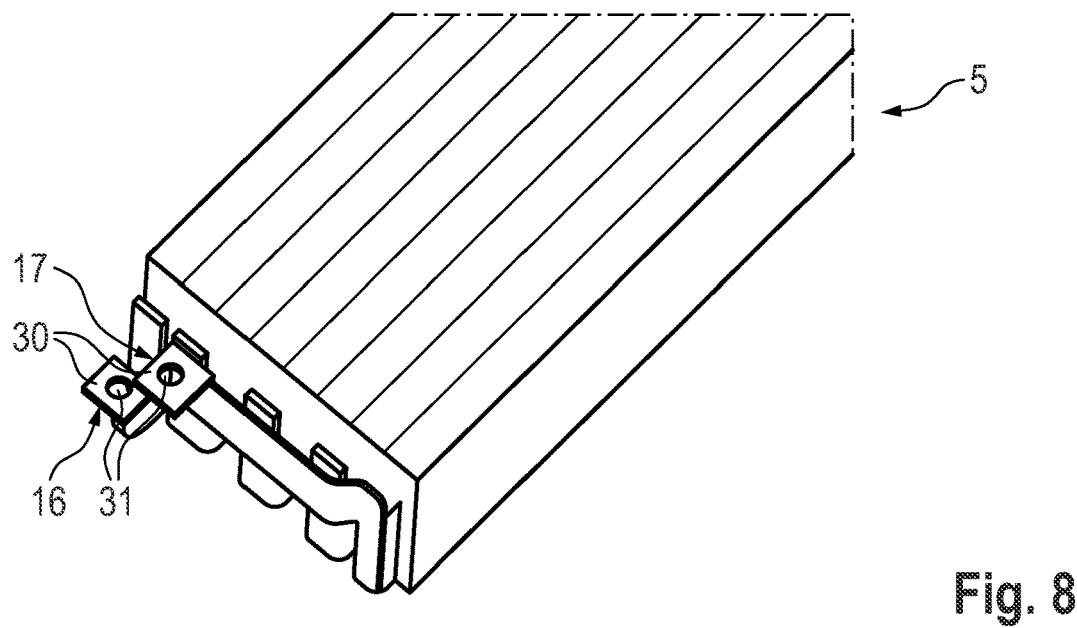
Figure 9:
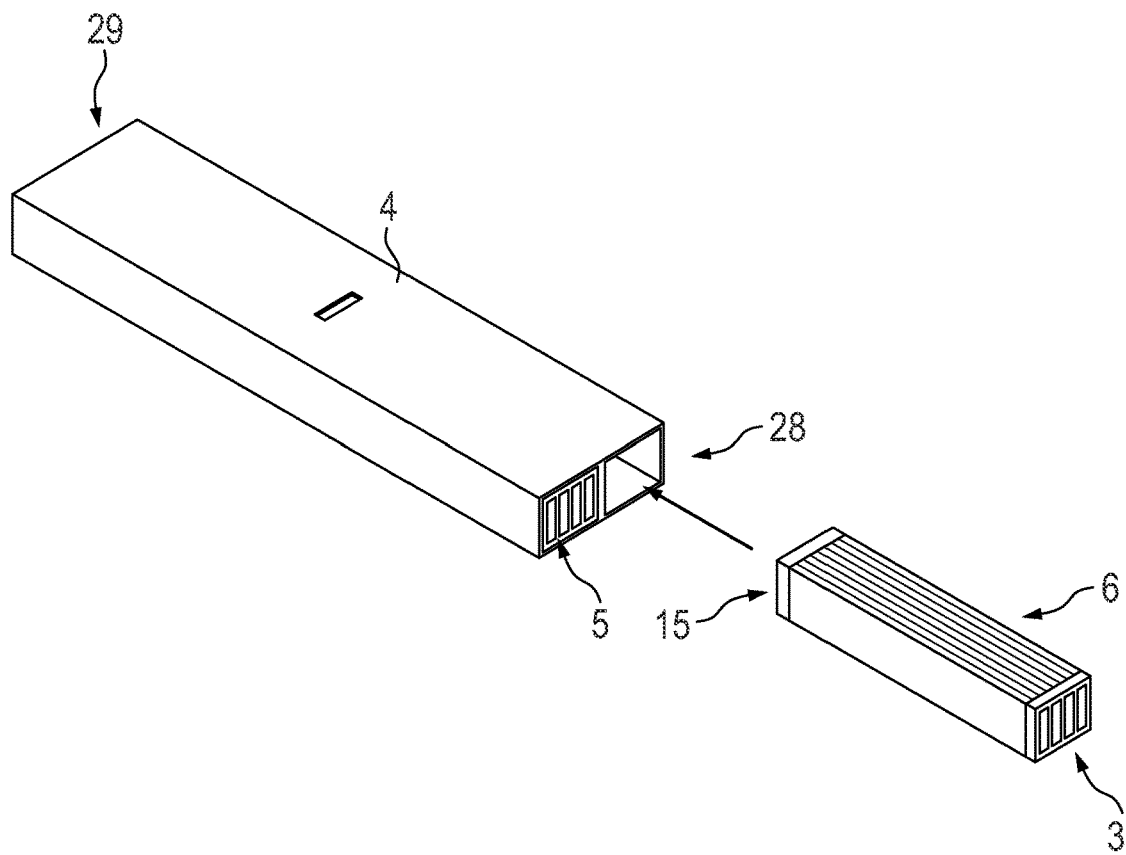
Figure 10:
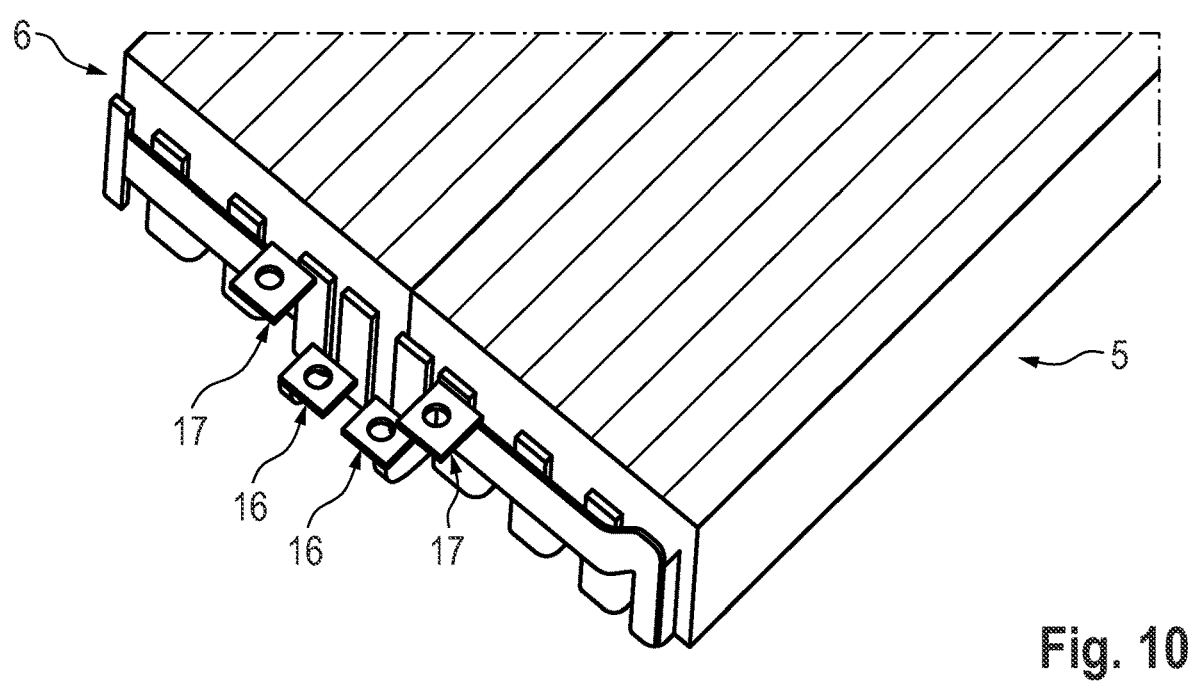
Figure 11:
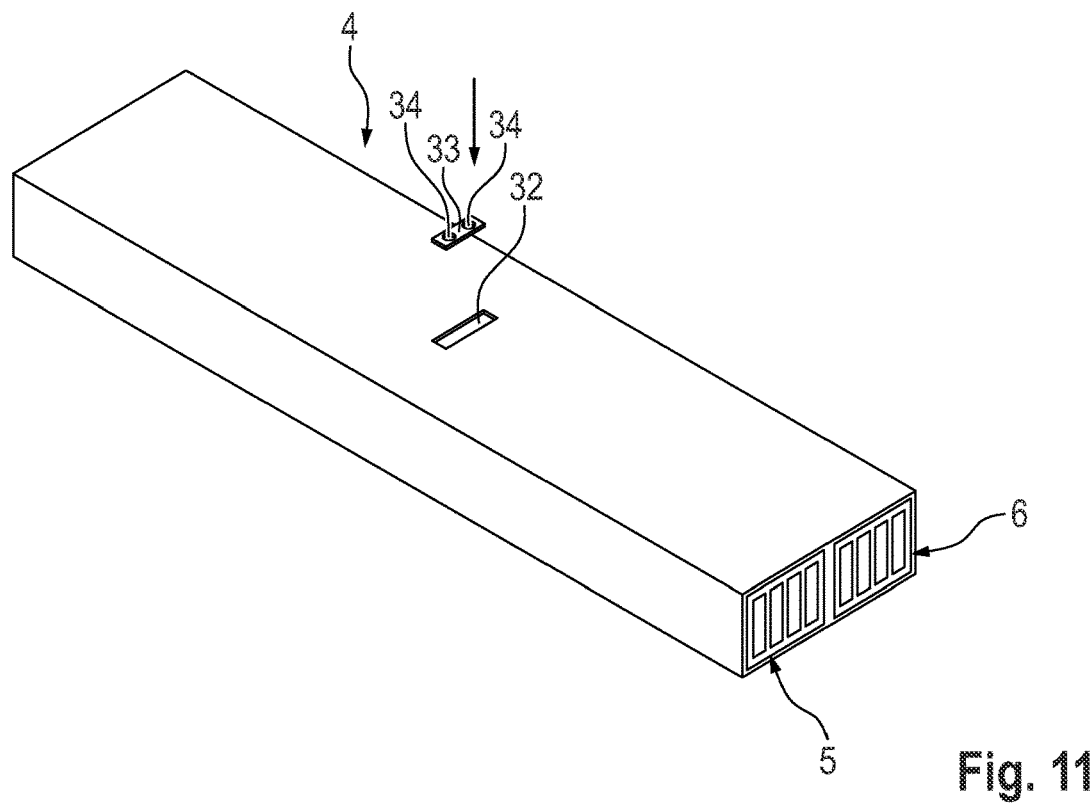
Figure 12:
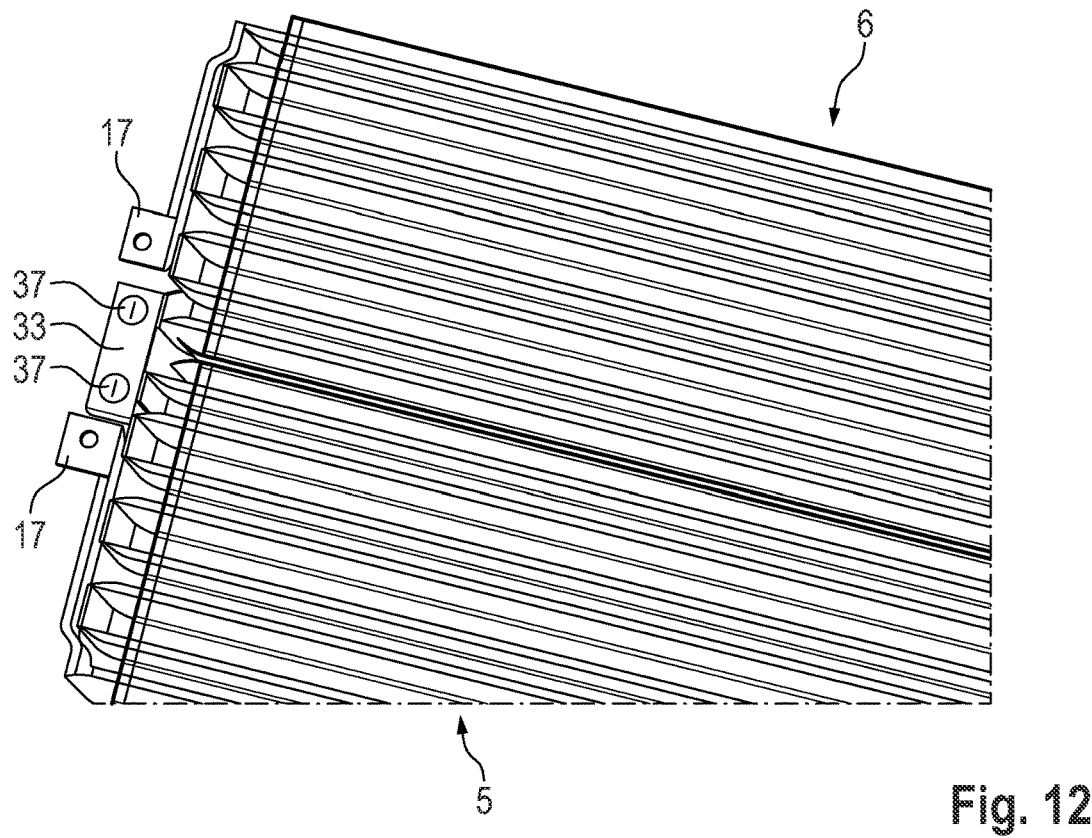
Figure 13:
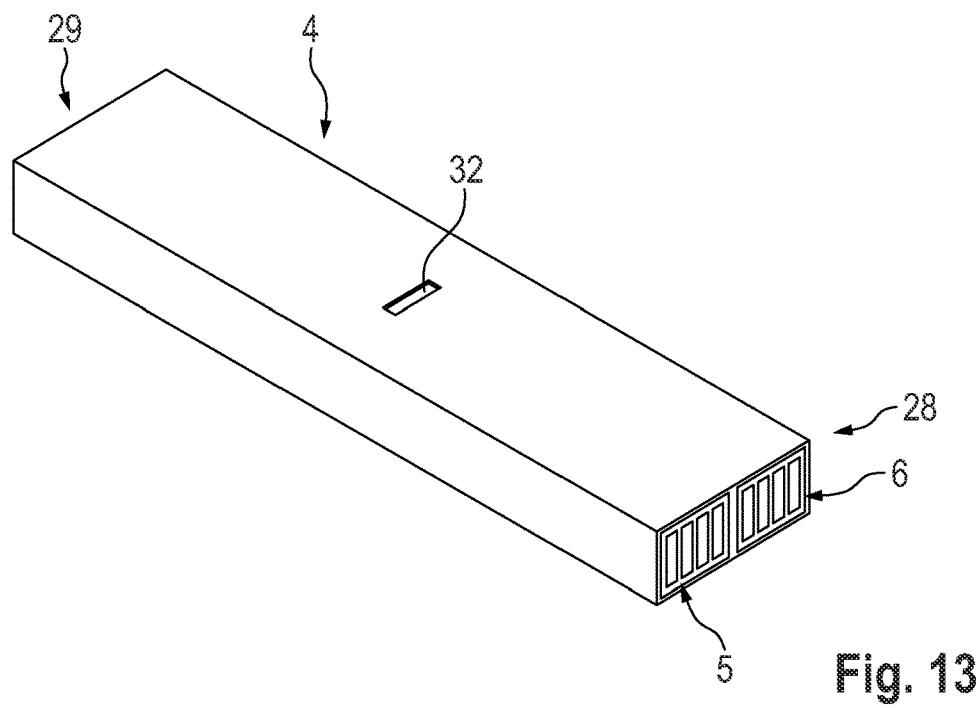
Figure 14:
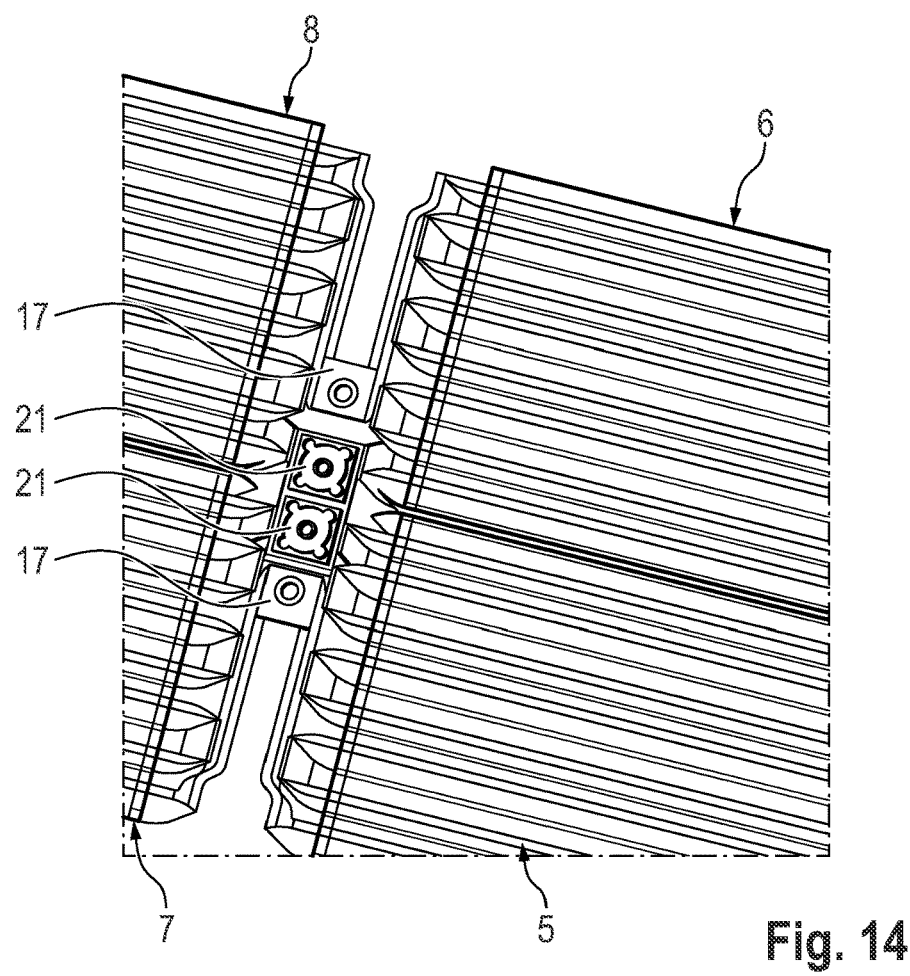
Figure 15:
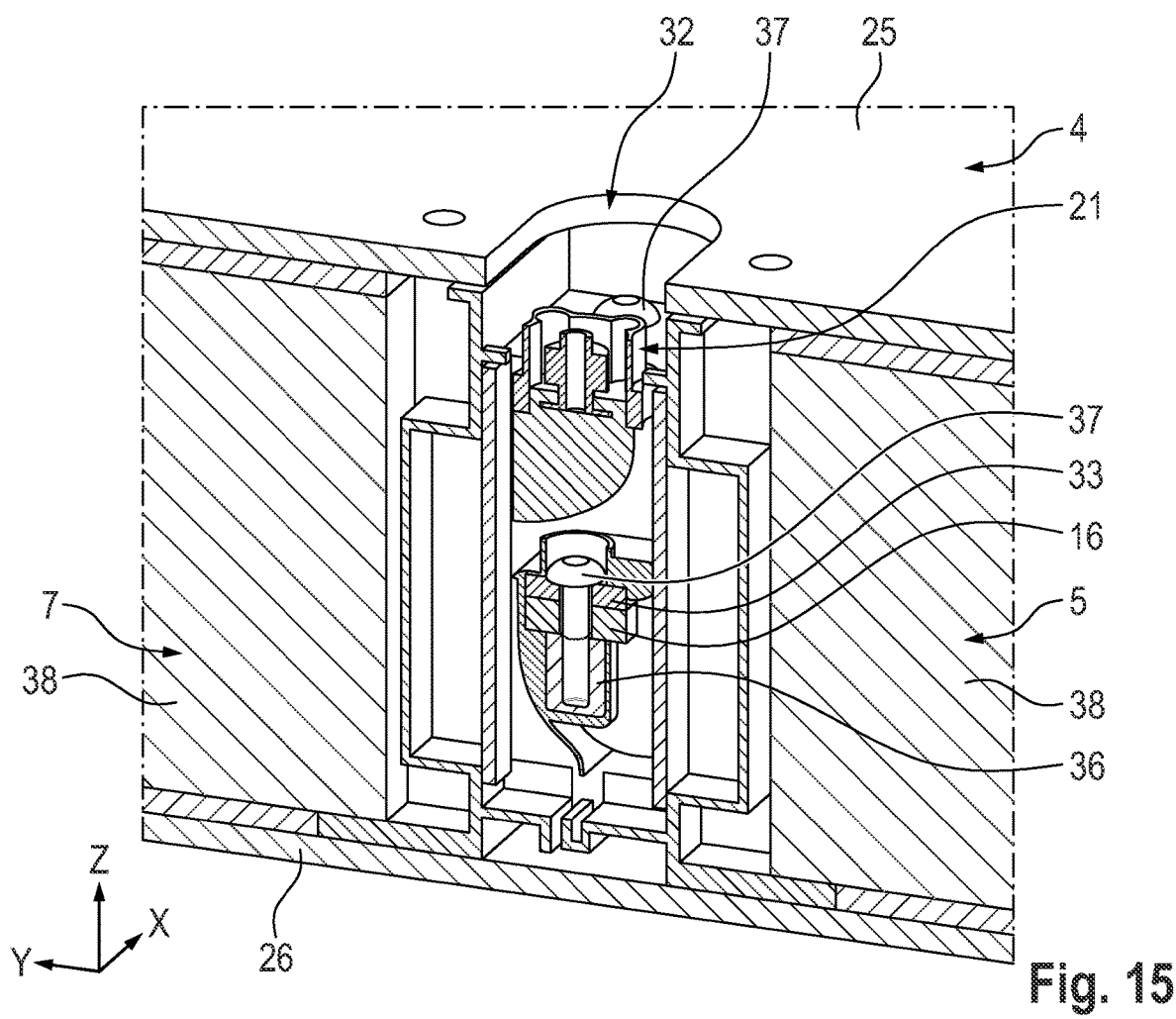
Figure 16:
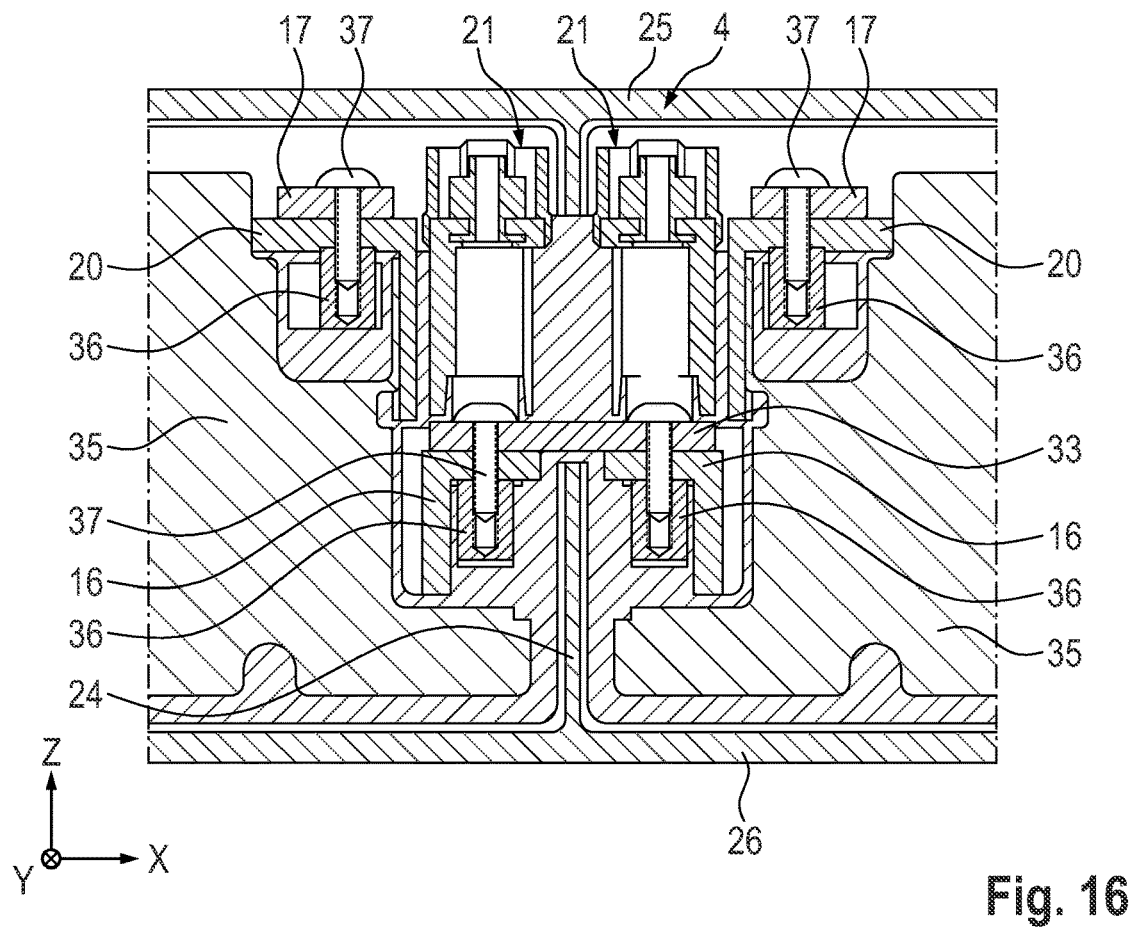
Figure 17:
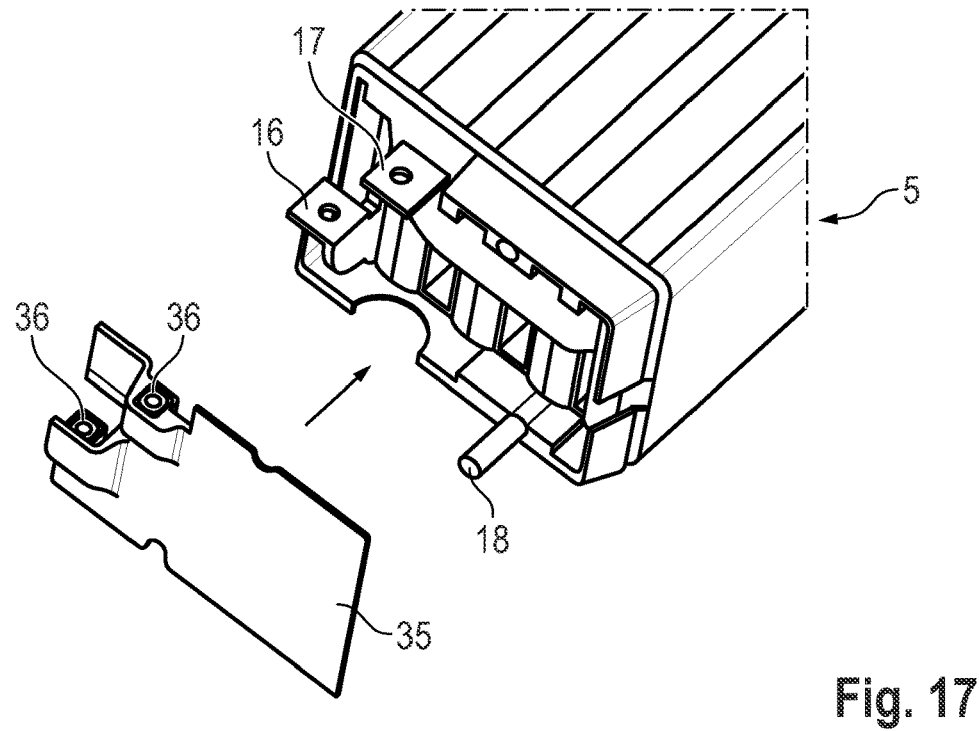

In the drawing:

FIG. 1 shows a schematic illustration of a structure of a passenger vehicle having battery modules arranged between sills, FIG. 2 shows an end region of a second cell stack based on the orientation in FIG. 1 for the respective battery module, FIG. 3 shows an end region of a first cell stack based on the orientation in FIG. 1 for the respective battery module, FIG. 4 shows an end region of a third cell stack based on the orientation in FIG. 1 for the respective battery module, FIG. 5 shows an end region of a fourth cell stack based on the orientation in FIG. 1 for the respective battery module, FIG. 6 shows a first method step for interconnecting the battery module, FIG. 7 shows a second method step for interconnecting the battery module, FIG. 8 shows a view of the region of the first cell stack that leads during insertion, relating to the second method step, FIG. 9 shows a third method step for interconnecting the battery module, FIG. 10 shows a view of the regions of the cell stacks of the first cell stack group that lead during insertion, before the interconnection thereof, relating to the ending of the third method step, FIG. 11 shows a fourth method step for interconnecting the battery module, FIG. 12 shows an illustration according to FIG. 10, after the interconnection of the two cell stacks of the first cell stack group, FIG. 13 shows a fifth method step for interconnecting the battery module, FIG. 14 shows the cell stacks of both cell stack groups arranged within the battery module housing with interconnection of the high-voltage connectors thereof, relating to the fifth method step, FIG. 15 shows a section in a Y-Z plane through the connection region in accordance with FIG. 14, FIG. 16 shows a section in an X-Z plane through the connection region in accordance with FIG. 14, FIG. 17 shows an exploded illustration of the first cell stack, in a view in accordance with FIG. 3.

DETAILED DESCRIPTION OF THE INVENTION

FIG. 1 illustrates a subregion of a motor vehicle 1, which is an electrically drivable passenger vehicle, for example. Two lateral sills 2 of the motor vehicle 1 having two battery modules 3 arranged between said sills are shown. Each battery module 3 has a battery module housing 4, which is designed as an extrusion profile with a rectangular cross section, and also four cell stacks arranged inside the battery module housing 4. In this case, for the purpose of unambiguous identification, the four cell stacks are a first cell stack 5, a second cell stack 6, a third cell stack 7 and a fourth cell stack 8. The first and second cell stack 5, 6 form a first cell stack group 9, the third and fourth cell stack 7, 8 form a second cell stack group 10.

The orientation of the motor vehicle 1 is specified by the coordinates X—vehicle longitudinal direction, Y—vehicle transverse direction and Z—vehicle vertical direction. The individual cell stacks 5 to 8 extend in the Y direction with respect to the longitudinal extent thereof. In the region of remote end sides, the battery module housing 4 adjoins the sills 2.

The basic structure of the cell stacks 5 to 8 is illustrated in FIGS. 2 to 5 for the respective end region of the cell stack that is to be interconnected. Each cell stack 5 to 8 has a top surface 11, a lateral surface 12, a lateral surface 13, a bottom surface 14, an end side 15 in the interconnection region and a further end side 39 on the remote side.

FIG. 2 shows, for the cell stack 6, that a high-voltage connector 16 is arranged in the region of the end side 15, adjoining the lateral surface 12, at approximately a third of the height of the cell stack 6, as seen from the bottom surface 14. The cell stack 6 furthermore has a further high-voltage connector 17 at a further distance from the lateral surface 12, at approximately two thirds of the height, as seen from the bottom surface 14. The cell stack 6 furthermore has a centering mandrel 18 in the region of the end side 15 next to the bottom surface 14 and a centering opening 19 in the region of the top surface 11.

As is apparent from the illustration of FIG. 3, the cell stack 5 is formed in the region of the end side 15 thereof in a substantially mirror-symmetrical manner to the cell stack 6 in the region of the end side 15 thereof, whereby the high-voltage connector 16 adjoins the lateral surface 13 and the high-voltage connector 17 is arranged further away from the lateral surface 13, at a level above the high-voltage connector 16.

The cell stack 7 illustrated in FIG. 4, which is provided for assembly with the cell stack 5, has a high-voltage connector 20 in the region of the end side 15 of said cell stack. This high-voltage connector is arranged at the same distance from the lateral surface 12 of the cell stack 7 as the high-voltage connector 17 of the cell stack 5 with respect to the lateral surface 13 thereof. However, the high-voltage connector 20 is arranged at a somewhat lower level than the high-voltage connector 17 of the cell stack 5, with the result that, when the two cell stacks 5 and 7 are plugged one into the other, that is to say the respective centering mandrel 18 is inserted into the centering opening 19 associated therewith, the high-voltage connector 17 of the cell stack 5 and the high-voltage connector 20 of the cell stack 7 overlap.

Furthermore, at a height of the high-voltage connector 20, the cell stack 7 has a high-voltage connection 21 adjoining the lateral surface 12. When the cell stacks 5 and 7 are plugged one into the other, this high-voltage connection is therefore arranged above the high-voltage connector 16 of the cell stack 5.

As is apparent from the illustration of FIG. 5, the cell stack 8 is formed in a mirror-symmetrical manner with respect to the cell stack 7, whereby the cell stack 8, adjoining the lateral surface 13, has a high-voltage connection 21 and further inside a high-voltage connector 20. In the case of the cell stacks 7 and 8, the centering mandrels 18 are arranged at the top and the centering openings 19 are arranged at bottom.

FIGS. 6 to 14 illustrate the method for interconnecting the cell stacks 5 to 8 of the battery module 3 in the high-voltage battery of the motor vehicle 1:

FIG. 6 shows the battery module housing 4, formed as an extrusion profile and having a rectangular cross section and a partition 24 dividing the battery module housing 4 into two identical chambers 22, 23. The battery module housing 4 has a rectangular cross section and the partition 24 connects an upper wall 25 and a lower wall 26 of the battery module housing 4. The two side walls of the battery module housing 4 are denoted by the reference number 27. In the region of half its length, with respect to the extent in the Y direction, the battery module housing 4 has an opening 32 extending in the X direction in the region of the upper wall 25 of said battery module housing. The partition 24 is separated in the region of the opening 32.

The battery module housing 4 is designed to be open in the region of the remote end sides and one end of the battery module housing 4 is denoted by the reference number 28, the other by the reference number 29.

As is apparent from the illustration in FIG. 7, the cell stack 5 is inserted, with the end side 15 thereof leading, into one end 28, in this case the chamber 22. FIG. 8 shows the cell stack 5 for its leading end with the components relevant for the interconnection, namely the high-voltage connector 16 and high-voltage connector 17.

The high-voltage connectors, wherein this applies to all described high-voltage connectors, have a plate section 30, through which a through hole 31 penetrates.

As is apparent from the illustration of FIG. 9, after the cell stack 5 has been inserted into the chamber 22 and pushed forward up to the opening 32, the cell stack 6 is inserted into the other chamber 23 and likewise pushed forward up to the opening 32. FIG. 10 shows the positioning of the cell stacks 5 and 6 in this pushed-forward state.

FIGS. 11 and 12 illustrate that a busbar 33 is brought into the interior of the battery module housing 4 by way of the elongate opening 32 by means of suitable handling means and is applied to the two high-voltage connectors 16 of the cell stacks 5 and 6. This busbar 33, which in this case is likewise formed as a plate section, has through holes 34 on the end side. In the region of these through holes 34 and the through holes 31 of the high-voltage connectors 16, the busbar 33 is screwed to said high-voltage connectors 16 in a manner to be described in more detail below.

FIG. 13 illustrates that the cell stack 7 is subsequently inserted into the chamber 22 and the cell stack 8 is subsequently inserted into the chamber 23 up to the opening 32 from the opposite end 29 of the battery module housing 4. In this case, as is apparent from the illustration of FIG. 14, the high-voltage connectors 17 of the cell stacks 5 and 6 overlap the high-voltage connectors 20 of the cell stacks 7 and 8. In this region, too, there is an electrical interconnection by way of mechanical connection by means of screwing, to be described in more detail. The two high-voltage connections 21, which are used for the external connection of the battery module 3, are therefore located above the contact connection of the cell stacks 5 and 6 by means of the busbar 33.

FIGS. 15 and 16 illustrate sectional illustrations of the connection of the high-voltage connectors 16, 17, 20 for the purpose of interconnecting the cell stacks 5 to 8 of the battery module 3. In particular, it is also apparent from the illustration of FIG. 17, as an example for a cell stack, in the present case the cell stack 5, that an additional component 35, which is provided in the region of the respective end side 15, is used to mount sleeves 36, which have an inner thread and into which a respective screw 37 can be screwed.

The reference number 38 denotes a cell, with respect to the illustration of FIG. 15 a cell of the respective cell stack 5 and 7.

The high-voltage connectors 17 and 20 may have starting bevels, with the result that these connectors are better positioned in a manner overlapping one another when inserted. The high-voltage connectors 16 and 20 can have elements for tolerance compensation. The high-voltage connections 21 of the battery module 3 can be contact-connected during battery assembly by way of the opening 32 in the battery module housing 4. In principle, the battery module housing 4 can have one or more openings for the contact connection of the cell stacks. The openings can be positioned on different sides of the battery module 3. However, the opening 32 for the contact connection of the cell stacks is preferably located on the top side of the battery module housing 4 in the vehicle position.

The method according to aspects of the invention along with the developments thereof brings about a considerable reduction in installation space, weight and cost by way of the installation-space-saving high-voltage interconnection of the cell stacks. The cell stacks can be positioned closer to one another using this high-voltage interconnection. This results in a narrower battery with a lower weight.

What is claimed is:

1. A method for interconnecting cell stacks of a battery module in a high-voltage battery, said method comprising:
   A. arranging a plurality of cell stacks in a battery module housing having an open end, said arranging step including (i) inserting two cell stacks of the plurality of cell stacks into the battery module housing such that the two cell stacks are arranged next to one another in an X-vehicle longitudinal direction, the two cells stacks being parallel to side walls of the battery module housing and forming a first cell stack group, and (ii) inserting two more cell stacks of the plurality of cell stacks into the battery module housing such that (a) the two more cell stacks are arranged next to one another in the X-vehicle longitudinal direction, the two more cells stacks being parallel to the side walls of the battery module housing and forming a second cell stack group and (b) the first and second cell stack groups are arranged behind one another in a Y-vehicle transverse direction with their ends oriented toward one another, the battery module housing having a partition separating the cell stacks of the respective cell stack groups, wherein the partition includes an interruption in the form of a recess to accommodate electrical interconnection between the two cell stacks of the first cell stack group,
   B. electrically interconnecting the two cell stacks of the first cell stack group via at least one opening arranged in a central region of a top wall of the battery module housing, wherein the at least one opening is positioned directly above and aligns with the recess of the partition, said electrically interconnecting comprising positioning a busbar through the opening and into the recess of the partition to electrically interconnect the two cell stacks of the first cell stack group; and
   C. electrically interconnecting each of the two cell stacks of the second cell stack group to a corresponding one of the two cell stacks of the first cell stack group via the at least one opening, wherein the two cell stacks of the first cell stack group are electrically interconnected on a side thereof that faces the second cell stack group.

2. The method as claimed in claim 1, wherein the battery module housing is open on remote end sides and the cell stacks of the first cell stack group are inserted into the battery module housing from one remote end side and the cell stacks of the second cell stack group are inserted into the battery module housing from the other remote end side.

3. The method as claimed in claim 1, wherein the battery module housing is an extrusion profile.

4. The method as claimed in claim 1, wherein the cell stacks of the second cell stack group are inserted into the battery module housing in such a way that external high-voltage connections of the two cell stacks of the second cell stack group are (i) spaced apart from first high-voltage connectors of the electrically interconnected cell stacks of the first cell stack group and (ii) located between the first high-voltage connectors and the at least one opening by which the two cell stacks of the first cell stack group are electrically interconnected.

5. The method as claimed in claim 4, wherein the cell stacks of the second cell stack group are inserted into the battery module housing in such a way that second high-voltage connectors of the two cell stacks of the second cell stack group make electrical contact with third high-voltage connectors of the cell stacks of the first cell stack group.

6. The method as claimed in claim 5, wherein the respective second and third high-voltage connectors are interconnected with one another via the at least one opening.

7. The method as claimed in claim 6, wherein the respective second and third high-voltage connectors are interconnected with one another by a screw connection.

8. The method as claimed in claim 5, wherein the second high-voltage connectors overlap the third high-voltage connectors in a vertical direction relative to the top wall of the battery module housing.

9. The method as claimed in claim 5, wherein said external high-voltage connections of the two cell stacks of the second cell stack group are arranged at least partially above the second high-voltage connectors of the two cell stacks of the second cell stack group and the third high-voltage connectors of the cell stacks of the first cell stack group.

10. The method as claimed in claim 9, wherein said external high-voltage connections of the two cell stacks of the second cell stack group are arranged above the busbar.

11. The method as claimed in claim 10, wherein the busbar comprises a plate and through holes on each end side of the plate, and each of the through holes is configured to be connected to one of the first high-voltage connectors of the two cell stacks of the first cell stack group.

12. The method as claimed in claim 4, wherein the first high-voltage connectors are interconnected with one another via the at least one opening by the busbar arranged in an interior of the battery housing.

13. The method as claimed in claim 12, wherein the first high-voltage connectors are connected to the busbar by screw connections.

14. The method as claimed in claim 1, wherein the cell stacks, which are arranged behind one another, of the first and second cell stack group are plugged one inside of the other.

15. The method as claimed in claim 1, wherein each of the two cell stacks of the second cell stack group are electrically interconnected to a corresponding one of the two cell stacks of the first cell stack group in the central region of the battery module housing.

16. The method as claimed in claim 1, wherein the at least one opening is centered with respect to both the X-vehicle longitudinal direction and the Y-vehicle transverse direction of the battery module housing.

17. The method as claimed in claim 1, wherein the two cell stacks of the first cell stack group are electrically interconnected by first high-voltage connectors arranged in an interior of the battery module housing and wherein the two cell stacks of the second cell stack group are electrically interconnected by second high-voltage connectors arranged in the interior of the battery module housing.

18. The method as claimed in claim 17, wherein the two cell stacks of the first cell stack group are electrically interconnected by the busbar that is brought into the interior of the battery module housing by way of the at least one opening and applied to the two first high-voltage connectors in the interior of the battery module housing.

19. The method as claimed in claim 1, wherein each of the two cell stacks of the first cell stack group comprises a first centering mandrel arranged next to a first bottom surface of each of the two cell stacks of the first cell stack group and a first centering opening arranged in a region of a first top surface of each of the two cell stacks of the first cell stack group and wherein each of the two cell stacks of the second cell stack group comprises a second centering mandrel arranged next to a second top surface of each of the two cell stacks of the second cell stack group and a second centering opening arranged in a region of a second bottom surface of each of the two cell stacks of the second cell stack group.

20. The method as claimed in claim 19, wherein each of the two cell stacks of the first cell stack group is plugged into a corresponding one of the two cell stacks of the second cell stack group by inserting the first centering mandrel into the second centering opening in the interior of the battery module housing and by inserting the second centering mandrel into the first centering opening in the interior of the battery module housing.

21. The method as claimed in claim 1, wherein each of the two cell stacks of the first cell stack group is mechanically connected to a corresponding one of the two cell stacks of the second cell stack group in the interior of the battery module housing without a wall or a partition separating each of the two cell stacks of the first cell stack group and the corresponding one of the two cell stacks of the second cell stack group.

* * * * *